(12) United States Patent
Gong et al.

(10) Patent No.: US 7,282,870 B2
(45) Date of Patent: Oct. 16, 2007

(54) DRIVING APPARATUS FOR CCFL

(75) Inventors: Jung Chul Gong, Seoul (KR); Byoung Own Min, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/420,944

(22) Filed: May 30, 2006

(65) Prior Publication Data
US 2006/0284570 A1 Dec. 21, 2006

(30) Foreign Application Priority Data
Jun. 20, 2005 (KR) ...................... 10-2005-0053161

(51) Int. Cl.
*G05F 1/00* (2006.01)
(52) U.S. Cl. ...................... 315/291; 315/224; 315/308; 315/307; 315/209 R; 315/244; 315/DIG. 5
(58) Field of Classification Search ............ 315/209 R, 315/291, 224, 244, 307, 308, 360, 362, DIG. 5, 315/DIG. 7; 363/98, 131, 132
See application file for complete search history.

(56) References Cited

U.S. PATENT DOCUMENTS

| | | | |
|---|---|---|---|
| 6,114,814 A * | 9/2000 | Shannon et al. ............ 315/219 |
| 6,259,615 B1 * | 7/2001 | Lin .............................. 363/98 |
| 6,281,642 B1 * | 8/2001 | Konishi et al. ............. 315/308 |
| 6,919,694 B2 * | 7/2005 | Moyer et al. ............... 315/224 |
| 6,927,989 B2 * | 8/2005 | Fukumoto .................... 363/95 |
| 2006/0279235 A1 * | 12/2006 | Gong et al. ................. 315/291 |

FOREIGN PATENT DOCUMENTS

JP   6243976   9/1994

* cited by examiner

*Primary Examiner*—Haissa Philogene
(74) *Attorney, Agent, or Firm*—Lowe Hauptman Ham & Berner

(57) ABSTRACT

The invention relates to a driving apparatus for a CCFL capable of easily providing a high output required to start the lamp. In the apparatus, an oscillator provides a reference signal in accordance with a lamp-on condition or a lamp-out condition. According to the invention, a tuning capacitor current of an oscillator is increased so that a switching speed of an inverter becomes faster in the lamp-out condition than in the lamp-on condition, thereby satisfying the voltage required to start the lamp.

3 Claims, 7 Drawing Sheets

DRIVING APPARATUS FOR CCFL

CLAIM OF PRIORITY

This application claims the benefit of Korean Patent Application No. 2005-53161 filed on Jun. 20, 2005, in the Korean Intellectual Property Office, the disclosure of which is incorporated herein by reference.

BACKGROUND OF THE INVENTION

1. Field of the Invention

The present invention relates to a driving apparatus for a cold cathode fluorescent lamp (CCFL). More particularly, the present invention relates to a driving apparatus for a CCFL capable of easily providing a high output required to start the lamp.

2. Description of the Related Art

A cold cathode fluorescent lamp (CCFL) has fluorescent material coated onto its interior wall of a glass tube. The CCFL lamp has electrodes attached to both ends of the tube, where tens of Torr of gas mixtures and a predetermined amount of mercury are sealed. The CCFL bears plenty of advantages such as high brightness, high color rendering, low power consumption of 2.0 W to 5.0 W, long useful life of 15,000 to 60,000 hr in a rated lamp current. Therefore it is well-utilized as a lighting device in an LCD back-light.

However, the CCFL exhibits large impedance if current is not applied and smaller impedance once the lamp is ignited. Therefore, to start the lamp requires high electric field energy of at least 1300V and about 800V is required once the lamp is ignited.

Thus, the driving apparatus for the CCFL should provide appropriate electric field energy in accordance with a lamp-on/lamp-out condition.

FIG. 1 is a circuit diagram illustrating a driving apparatus for a CCFL. Referring to FIG. 1, the driving apparatus for the CCFL 10 includes: an oscillator 11 for providing a reference signal; a pulse width modulation (PWM) driver 12 for dividing the reference signal outputted from the oscillator 11 by a predetermined rate, and comparing the divided signal with a PWM dimming control signal applied from the outside to output a PWM switching control signal having an on/off duty rate adjusted; an inverter 13 for switching on and off in response to the switching control signal outputted from the PWM driver and inverting direct current into alternating current of a predetermined frequency; and a resonance circuit 14 for outputting the alternating current of a predetermined frequency outputted from the inverter 13 to the lamp 10.

The inverter 13 includes two switching devices SW1, SW2 of a half bridge structure connected in series between a current input terminal and a ground. The switching devices SW1, SW2 switch on/off alternately to output the alternating current of a predetermined frequency. The alternating current outputted from the inverter 13 is applied to the lamp 10 through the resonance circuit 14.

A PWM controller 12 divides the reference signal of a predetermined frequency outputted from the oscillator 11 by ½, and adjusts an on/off duty rate of the divided signal in response to a PWM control signal $V_{PWM}$ to control brightness of the lamp 10.

In the driving apparatus for the CCFL of this configuration, high electric field energy required to start the lamp can be attained by controlling only an on/off duty rate of the switching devices SW1, SW2 through the PWM controller 12, with a switching speed of the inverter 13 fixed.

FIG. 2 is a timing diagram for explaining a driving function of a conventional CCFL in case of starting the lamp, in which (a) and (b) are switching control signals applied to the switching devices SW1, SW2, respectively, and (c) is an output current applied to the lamp 10 in case where the switching control signal is applied as in (a) and (b). Referring to FIG. 2(a) and (b), conventionally, if the lamp needs to be ignited, the switching control signal of a maximum duty rate is applied to the inverter until the lamp 10 turns to an ignited condition from an extinguished condition. After the lamp 10 is ignited, the duty rate is adjusted in accordance with a designated brightness.

However, in case where the inverter 13 of a half bridge structure is employed as described above, two switching devices SW1, SW2 should not be on at the same time and thus the maximum duty rate is 50% or less. This renders it impossible to satisfy the voltage required to start the lamp. Also, in case where the voltage for starting the lamp cannot be sufficiently boosted, the lamp operates unstably like flickering.

SUMMARY OF THE INVENTION

The present invention has been made to solve the foregoing problems of the prior art and it is therefore an object of the present invention to provide a driving apparatus for a cold cathode fluorescent lamp (CCFL) capable of easily providing a high output required to start the lamp.

According to an aspect of the invention for realizing the object, there is provided a driving apparatus for a cold cathode fluorescent lamp (CCFL) comprising: an oscillator for oscillating based on a tuning resistor and a tuning capacitor; a pulse width modulation (PWM) driver for dividing a signal outputted from the oscillator by a predetermined rate, and adjusting an on/off duty rate of the divided signal in response to a PWM control signal which controls brightness to generate a switching control signal; an inverter for inverting direct current into alternating current of a predetermined frequency, the inverter including a plurality of switching devices of a half bridge structure which switch on and off alternately in response to the switching control signal outputted from the PWM driver; a resonance circuit for outputting the alternating current outputted from the inverter as a lamp driving voltage; a feedback circuit for detecting an extinction of the lamp through the feedback of a voltage applied to the lamp and according to the extinction detection, outputting a current control signal; and a current controller for controlling a current amount flowing in the tuning capacitor of the oscillator in response to an extinction detection signal of the feedback circuit so that a higher tuning capacitor current flows through the lamp in an ignited condition than in an extinguished condition.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described in detail with reference to the accompanying drawings.

Figure 1:
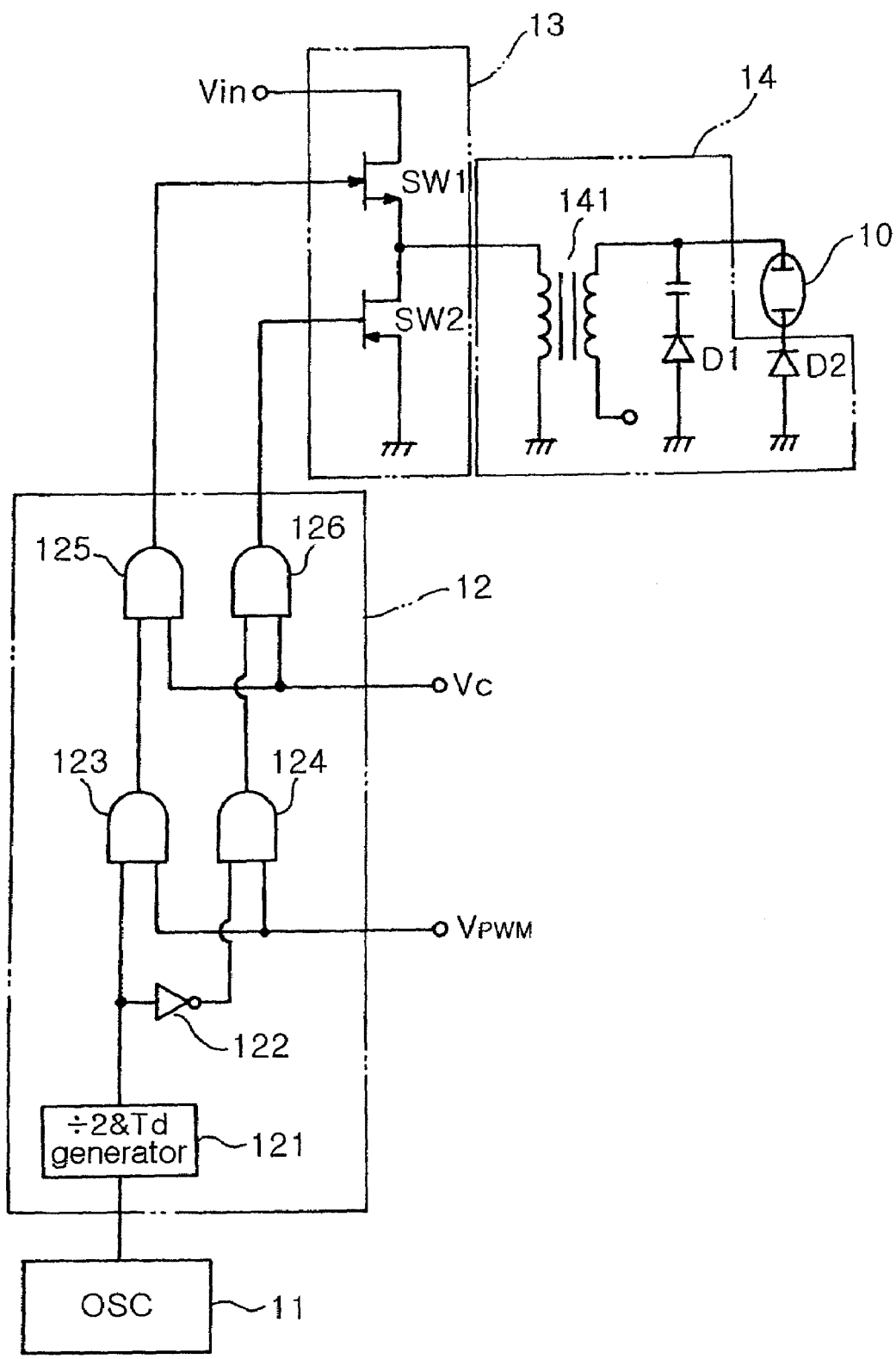
FIG. 1 is a circuit diagram illustrating a driving apparatus for a cold cathode fluorescent lamp (CCFL) of the prior art.
Figure 2:
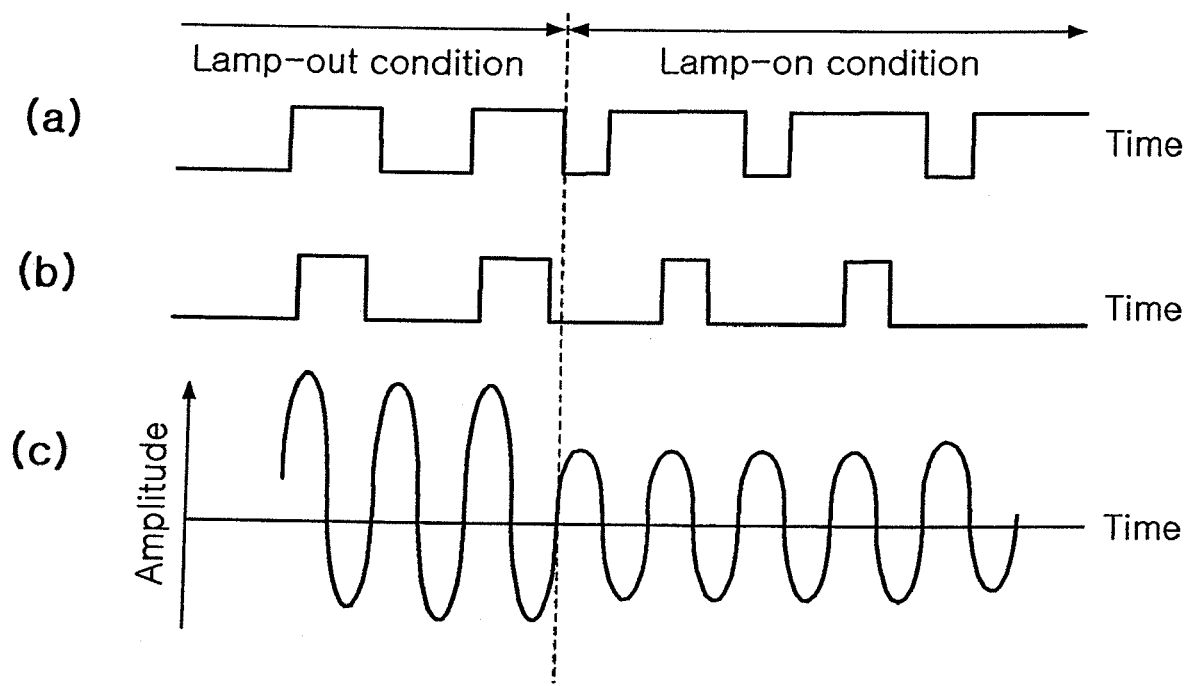
FIG. 2 is a timing diagram illustrating operation of the driving apparatus for the CCFL of the prior art.
Figure 3:
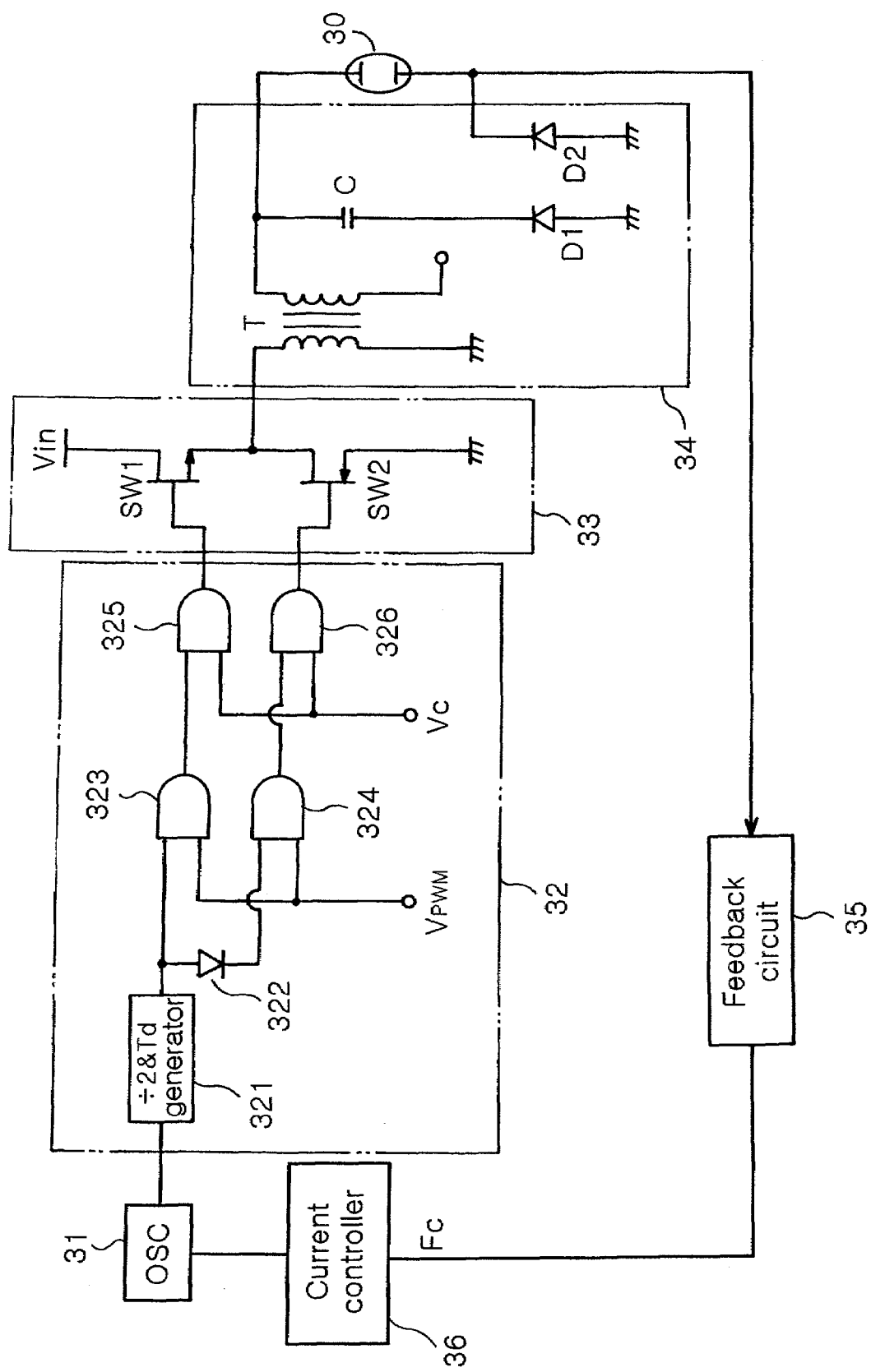
FIG. 3 is a block diagram illustrating a driving apparatus for a CCFL of the invention.

FIG. 3 is a block diagram illustrating an entire configuration of a driving apparatus for a cold cathode fluorescent lamp (CCFL) of the invention.

Referring to FIG. 3, the driving apparatus for the CCFL of the invention includes an oscillator 31 for RC-oscillating based on a tuning resistor and a tuning capacitor; a pulse width modulation (PWM) driver 32 for driving a signal outputted from the oscillator 31 by a predetermined rate, and adjusting an on/off duty rate of the divided signal in response to a PWM control signal which controls brightness to generate a switching control signal; an inverter 33 for inverting direct current into alternating current of a predetermined frequency, the inverter including a plurality of switching devices SW1, SW2 of a half bridge structure which switch on and off alternately in response to the switching control signal outputted from the PWM driver 32; a resonance circuit 34 for outputting the alternating current of a predetermined frequency outputted from the inverter 33 to the lamp 30; a feedback circuit 35 for detecting an extinction of the lamp through the feedback of a voltage applied to the lamp 30; and a current controller 36 for increasing capacitor current of the oscillator 31 if a signal indicative of a lamp-out condition is applied, and decreasing capacitor current of the oscillator 31 to a reference level if a signal indicative of a lamp-on condition is applied.

The oscillator 31 is a general RC oscillator, and an oscillating frequency is determined by a tuning resistor (not illustrated) and a tuning capacitor (not illustrated) in the oscillator 31. Moreover, the oscillating frequency of the oscillator 31 increases in proportion to current of the tuning capacitor. That is, an increase in the tuning capacitor current applied to the oscillator 31 also leads to an increase in the oscillating frequency. Such properties of the RC oscillator 31 are well-known in the art.

The driving apparatus for the CCFL of the invention further includes the feedback circuit 35 and the current controller 36. A bias current applied to the oscillator 31 is varied in accordance with the lamp-on/out condition to modify the frequency outputted from the oscillator 31. Consequently, a switching speed of the inverter 33 is further accelerated until the lamp turns on from the extinguished condition in order to provide electric field energy required to start the lamp 30.

With regards to the PWM driver 32, the numeral 321 (not explained) denotes a divider-Td generator which divides the frequency applied from the oscillator 31 by ½ and generates the PWM switching signal. Also, logical devices 322-324 are a means for logically combining a reference clock outputted from the divider-Td generator 321 with the PWM control signal $V_{PWM}$, which is the brightness control signal to adjust an on/off duty rate of the PWM switching signal. And gates 325 and 326 logically combine a control signal Vc indicative of any errors of the lamp 30 with the PWM switching signal. If the control signal (e.g. logic 0) indicative of any errors is applied, logic 0 is outputted to stop a switching operation of the inverter 33. This PWM driver 32 is identically configured to a conventional PWM driver and may be configured variously.

Figure 4:
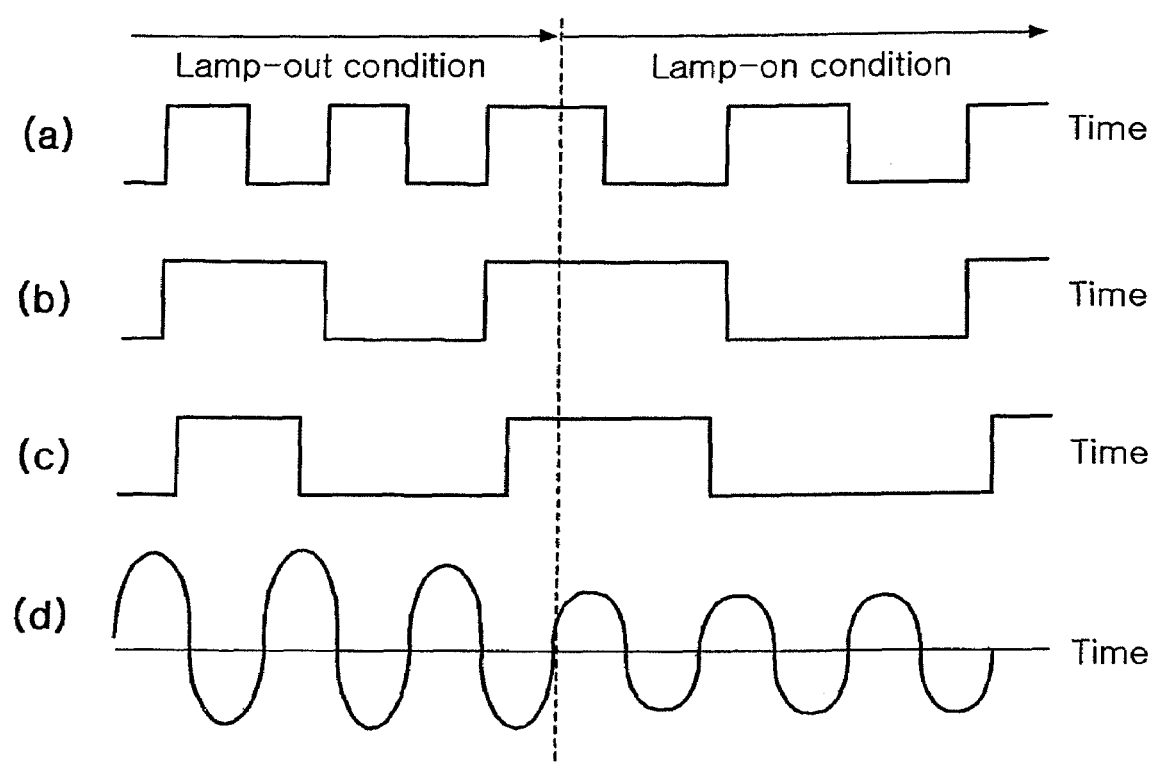
FIG. 4 is a timing diagram illustrating operation of the driving apparatus for the CCFL of the invention.

FIG. 4 is a timing diagram illustrating operation of starting the driving apparatus for the CCFL of the invention. In FIG. 4, (a) shows a reference signal outputted from the oscillator 31, (b) and (c) show switching control signals applied from the PWM driver 32 to two switching devices SW1, SW2 of the inverter, and (d) shows a driving voltage applied to the lamp 30 by the resonance circuit 34.

As shown in FIG. 4, in the driving apparatus for the CCFL of the invention, if the lamp 30 needs to be ignited, the oscillator 31 outputs a signal of a higher frequency than that in a lamp-on condition. The PWM driver 32 controls a switching operation of the inverter 33 based on the signal of the higher frequency. Therefore, with an increase in a switching speed of the inverter 33, an output voltage applied to the lamp 30 is also boosted. Further, if the lamp 30 is ignited, the oscillator 31 outputs a lower frequency than before. The PWM driver 32 and the inverter 33 operate based on the lower frequency, and thus switch on/off more slowly. Consequently, the voltage outputted to the lamp 30 becomes lower in the case of lamp ignition than in the case of lamp extinction.

An output frequency of the oscillator 31 in the case of lamp ignition as described above is a reference frequency set for a general driving apparatus for a CCFL. The output frequency of the oscillator 31 in the case of lamp extinction is higher than the reference frequency. Practically, the voltage level required to start the lamp 30 can be attained by setting the frequency in the case of lamp extinction to be 1.5 times higher than in the case of lamp ignition.

Thereafter, with respect to the driving apparatus for the CCFL of the invention, an explanation will be given about a feedback circuit 35 for adjusting a frequency of the oscillator 31 and a current controller 36 in greater detail.

Figure 5:
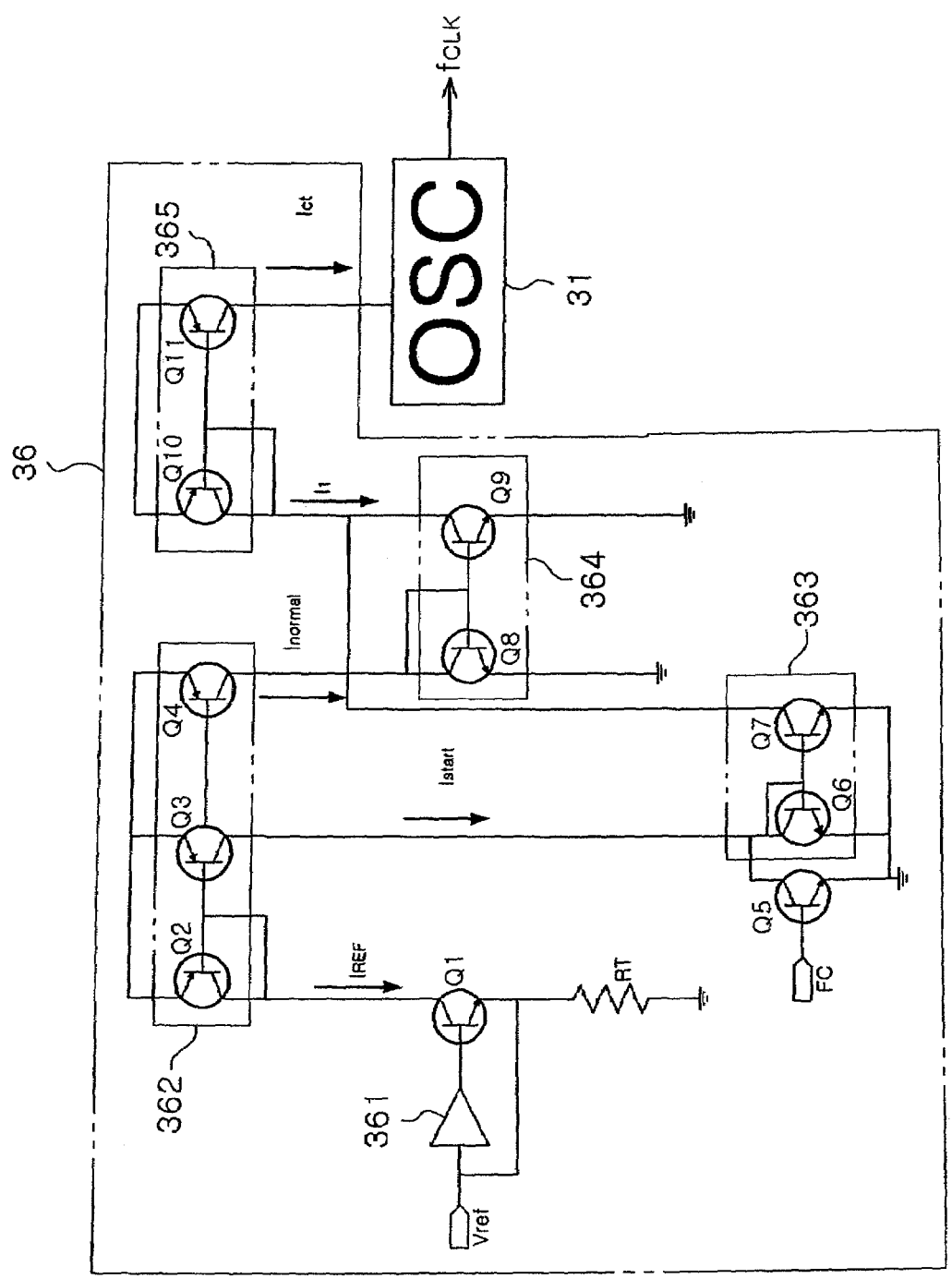
FIG. 5 is a detailed circuit diagram illustrating a current controller of the driving apparatus for the CCFL of the invention.

FIG. 5 is a detailed circuit diagram illustrating the current controller 36 of the driving apparatus for the CCFL of the invention.

Referring to FIG. 5, the current controller 36 includes a buffer 361 for receiving a reference voltage Vref; a first transistor Q1 having an emitter terminal grounded through a resistor RT and a base connected to an output of the buffer 361; a current repeater 362 including a second transistor Q2 having a base and a collector commonly coupled to a collector of the first transistor Q1, and third and fourth transistors Q3, Q4 each having a base and an emitter commonly coupled to a base and an emitter of the second transistor Q2, respectively; a fifth transistor Q5 for operating on/off in response to the current control signal Fc, the transistor collector-emitter coupled between a collector of the third transistor Q3 and a ground; a first current mirror 363 including a collector-grounded, sixth transistor Q6 having an emitter and a base connected to the collector of the third transistor, and a collector-grounded, seventh transistor Q7 having a base connected to the collector of the third transistor Q3; a second current mirror 364 including an emitter-grounded, eighth transistor Q8 having a collector and a base coupled to a collector of the fourth transistor Q4, and an emitter-grounded, ninth transistor Q9 having a base connected to the collector of the fourth transistor Q4; and a third current mirror 365 including a tenth transistor Q10 having a collector and a base commonly coupled to the collectors of the seventh and ninth transistors Q7, Q9, and an eleventh transistor Q11 base-emitter coupled to the tenth transistor Q10 and having a collector connected to the tuning capacitor (not illustrated) of the oscillator 31.

With respect to operation of the current controller 36 as configured above, first, a reference current $I_{REF}$ of the current repeater 362 is determined by the reference voltage $V_{ref}$ and the resistor RT. The reference current $I_{REF}$ is expressed by Equation 1 below:

$$I_{REF} = \frac{V_{ref}}{RT}. \quad \text{Equation 1}$$

Current almost identical to the reference current $I_R$ flows in the collectors of the third transistor Q3 and fourth transistor Q4. Hereinafter, the collector current of the third transistor Q3 is called a start current $I_{start}$ and the collector current of the fourth transistor Q4 is called a normal current $I_{normal}$.

Further, operation of the first current mirror 363 is determined in response to the current control signal FC from the feedback circuit 35. That is, in a lamp-out condition, if the current control signal FC of the low level is applied from the feedback circuit 35, the fifth transistor Q5 is turned off and the start current $I_{start}$ is inputted as the reference current of the first current mirror 363. Then the start current $I_{start}$ is transferred to the third current mirror 36 by the first current mirror 363. In contrast, in a lamp-on condition, if the current control signal FC of the high level is applied from the feedback circuit 35, the fifth transistor Q5 is turned on to bypass the start current $I_{start}$ flowing in the collector of the third transistor Q3 to a ground. Consequently, the first current mirror 363 does not operate so that the start current $I_{start}$ is not mirrored to the third current mirror 365.

At this time, the second current mirror 364 applies current $I_{normal}$ flowing in the collector of the fourth transistor Q4 to the tenth transistor Q10 of the third current mirror 365.

Then, the third current mirror 365 mirrors current inputted to the tenth transistor Q10 of the third current mirror 365, and applies the same as the tuning capacitor current $I_{CT}$ of the oscillator 31.

As a result, an output current of the third current mirror 365 is expressed by an equation $I_{ct} = I_{normal}$ in the lamp-on condition, and $I_{ct} = I_{normal} + I_{start}$ in the lamp-out condition. Herein, an output frequency of the oscillator 31 or an oscillating frequency is proportional to the current $I_{CT}$ applied to the tuning capacitor. Therefore, the oscillating frequency is higher in the lamp-out condition than in the lamp-on condition.

As stated above, a higher oscillating frequency outputted from the oscillator 30 increases a switching speed of the inverter 33 and subsequently an output voltage of the resonance circuit 34.

The feedback circuit 35 inspects a voltage of the lamp 30 to ensure operation of the current controller 36 as described above, judges whether the lamp 30 is in the on or out condition and then accordingly applies the current control signal Fc to the current controller 36.

Therefore, in starting the lamp 30, the oscillator 30 outputs a high oscillating frequency until the lamp 30 turns on. This accelerates a switching speed of the inverter 33, boosting an output voltage applied to the lamp 30 to a level adequate for starting the lamp 30 (about 1300V). Also, if the lamp 30 is turned on by the high output voltage and thus impedance is lowered, the feedback circuit 35 detects it and outputs the current control signal FC of the high level. This decreases the oscillating frequency of the oscillator 30 and reduces a switching speed of the inverter 33, adjusting the output voltage applied to the lamp 30 to a level required in the lamp-on condition (about 800V).

Figure 6:
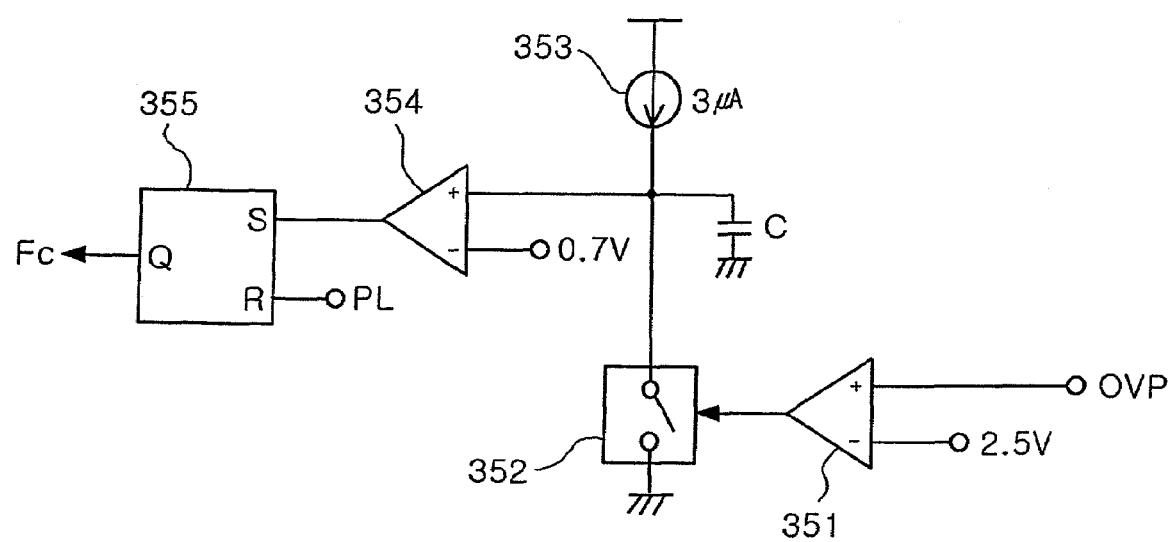
FIG. 6 is a detailed circuit diagram illustrating a feedback circuit of the driving apparatus for the CCFL of the invention.

FIG. 6 is a circuit diagram illustrating an example of the feedback circuit 35 as described above. The feedback circuit for detecting a lamp-on/out condition includes a first comparator 351 for comparing a voltage OVP applied to the lamp 30 (e.g. 2.5V) with a reference voltage (e.g. 2.5V); a switch 352 for switching on in case of the voltage OVP of more than 2.5V and switching off in case of the voltage OVP of 2.5V or less in response to a comparison result of the first comparator 351; a current source 353 grounded through the switch 352 and through a capacitor C; a second comparator 354 for comparing a contact voltage of the current source 353, capacitor C and switch 352 with a reference voltage 0.7V, and outputting logic 1 if the contact voltage is larger than the reference voltage and outputting logic 0 if the contact voltage is smaller than the reference voltage; and a RS latch 355 for having an input terminal S connected to an output of the second comparator 354 and an output terminal Q connected to a fifth transistor Q5 of the current controller 36.

In the lamp-out condition, the voltage OVP inputted to the first comparator 351 turns to the low level (about 2.5V or less). Therefore, the output of the first comparator 351 becomes the low level so that the switch 352 is turned off and current of the current sources 353 is applied to the capacitor C. Thereby, a voltage charged on the capacitor C increases and the output of the second comparator 354 becomes the high level (logic 1). With an input of logic 1, the RS latch 355 outputs the low level signal. That is, the current control signal FC applied to the current controller 36 turns to the low level.

In contrast, in the lamp-on condition, a voltage OVP inputted to the first comparator 351 becomes a reference level (about 2.5V) or higher, accordingly turning the switch on. If the switch 352 is turned on, current applied from the current sources is bypassed to a ground and the voltage charged on the capacitor C is almost reduced to 0. Therefore, the second comparator 354 outputs the low level signal (logic 0) and an output of a RS latch 355 turns to the high level. That is, the current control signal FC applied to the current controller 36 becomes the high level.

According to functions as stated above, the feedback circuit 35 applies the current control signal FC indicative of the lamp-on/out condition to the current controller 36.

Figure 7:
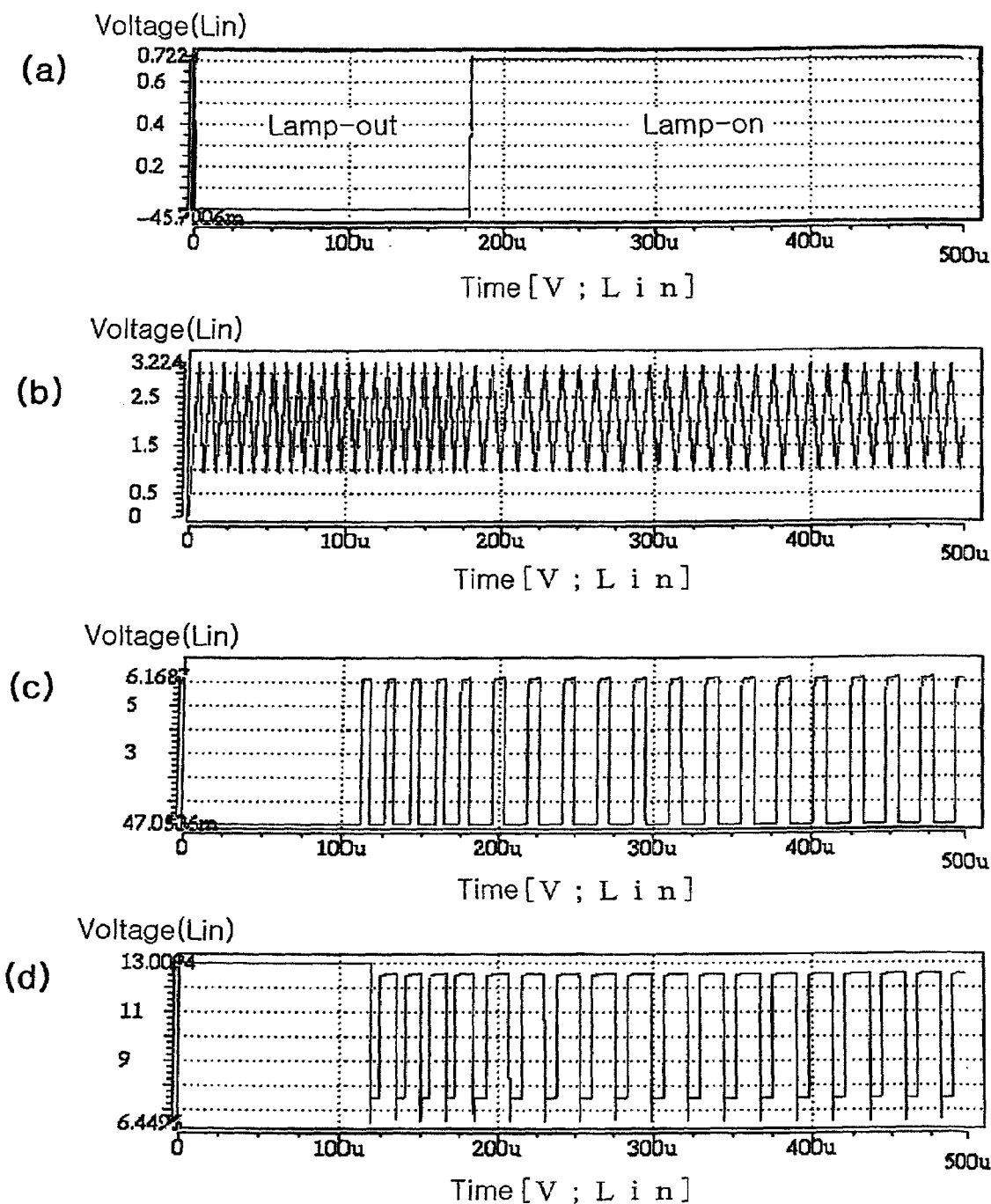
FIG. 7 is a graph illustrating a simulation result of the driving apparatus for the CCFL of the invention.

FIG. 7 is a graph illustrating a simulation result of the driving apparatus for the CCFL of the invention.

FIG. 7(a) illustrates a current control signal FC applied from the feedback circuit 35 to a current controller 36 in case of starting the driving apparatus for the CCFL of the invention. If the lamp 30 is not ignited, the low level signal is outputted and after the lamp is ignited, the high level signal is outputted.

FIG. 7(b) illustrates a frequency signal outputted from the oscillator 31 in case of starting the driving apparatus for the CCFL of the invention. A frequency is higher in the lamp-out condition than in the lamp-on condition.

Further, FIGS. 7(c) and (d) each illustrate a switch control signal applied to switching devices SW1, SW2 of the inverter 33 of the driving apparatus for the CCFL according to the invention. A pulse type switching control signal is outputted from a time point when the lamp 30 needs to be ignited. A pulse cycle is faster before the lamp-on condition than after the lamp-on condition. The pulse cycle corresponds to the switching speed. The aforesaid simulation graph ensures understanding about functions of the driving apparatus for the CCFL as described above.

As set forth above, according to the invention, a switching speed of a half-bridge structured inverter is increased in the lamp-out condition so that a voltage level required to start the lamp can be easily satisfied and further the lamp can be ignited stably.

While the present invention has been shown and described in connection with the preferred embodiments, it will be apparent to those skilled in the art that modifications and variations can be made without departing from the spirit and scope of the invention as defined by the appended claims.

What is claimed is:

1. A driving apparatus for a cold cathode fluorescent lamp (CCFL) comprising:
   an oscillator for oscillating at a frequency based on a tuning resistor and a tuning capacitor;
   a pulse width modulation (PWM) driver for dividing a signal outputted from the oscillator by a predetermined rate, and adjusting an on/off duty rate of the divided signal in response to a PWM control signal which controls brightness to generate a switching control signal;
   an inverter for inverting direct current into alternating current of a predetermined frequency, the inverter including a plurality of switching devices of a half bridge structure which switch on and off alternately in response to the switching control signal outputted from the PWM driver;
   a resonance circuit for outputting the alternating current outputted from the inverter as a lamp driving voltage;
   a feedback circuit for detecting an extinction of the lamp through the feedback of a voltage applied to the lamp and according to the extinction detection, outputting a current control signal; and
   a current controller for controlling a current amount flowing in the tuning capacitor of the oscillator in response to an extinction detection signal of the feedback circuit so that a higher tuning capacitor current flows through the lamp in an ignited condition than in an extinguished condition.

2. The driving apparatus according to claim 1, wherein the current controller comprises:
   a buffer for receiving a reference voltage;
   a first transistor having an emitter grounded through a resistor and a base connected to an output of the buffer;
   a current repeater including a second transistor having a base and a collector commonly coupled to a collector of the first transistor, and third and fourth transistors each having a base and an emitter commonly coupled to the base and an emitter of the second transistor, respectively;
   a fifth transistor for operating on/off in response to the current control signal, the transistor collector-emitter coupled between a collector of the third transistor and a ground;
   a first current mirror including a collector-grounded, sixth transistor having an emitter and a base connected to the collector of the third transistor, and a collector-grounded, seventh transistor having a base connected to the collector of the third transistor;
   a second current mirror including an emitter-grounded, eighth transistor having a collector and a base coupled to a collector of the fourth transistor, and an emitter-grounded, ninth transistor having a base connected to the collector of the fourth transistor; and
   a third current mirror including a tenth transistor having a collector and a base commonly coupled to the collectors of the seventh and ninth transistors, and an eleventh transistor base-emitter coupled to the tenth transistor and having a collector connected to the tuning capacitor of the oscillator.

3. The driving apparatus according to claim 1, wherein the feedback circuit comprises:
   a first comparator for comparing the voltage applied to the lamp with a first reference voltage through the feedback of the voltage;
   a switch for switching on/off in response to a result of the first comparator;
   a current source grounded through the switch and through a capacitor;
   a second comparator for comparing the voltage of the capacitor with a second reference voltage; and
   an SR latch for receiving a signal outputted from the second comparator via a set terminal, and outputting the current control signal to an output terminal.

* * * * *